(12) United States Patent
Tsai

(10) Patent No.: US 12,528,178 B1
(45) Date of Patent: Jan. 20, 2026

(54) TOOL BOX ASSEMBLY

(71) Applicant: Chang-Yu Tsai, Taichung (TW)

(72) Inventor: Chang-Yu Tsai, Taichung (TW)

( * ) Notice: Subject to any disclaimer, the term of this patent is extended or adjusted under 35 U.S.C. 154(b) by 0 days.

(21) Appl. No.: 18/776,550

(22) Filed: Jul. 18, 2024

(51) Int. Cl.
*B25H 3/02* (2006.01)
*B62B 1/04* (2006.01)

(52) U.S. Cl.
CPC .............. *B25H 3/021* (2013.01); *B62B 1/04* (2013.01); *B62B 2202/48* (2013.01)

(58) Field of Classification Search
CPC ...... B25H 3/021; B25H 3/02; B65D 21/0228; B65D 21/0212; B65D 21/00224; B65D 21/0222
USPC ................................ 206/506, 503, 505, 508
See application file for complete search history.

(56) References Cited

U.S. PATENT DOCUMENTS

| | | | | |
|---|---|---|---|---|
| 4,893,724 A * | 1/1990 | Schiemann | .......... | B65D 47/088 220/815 |
| 5,011,013 A * | 4/1991 | Meisner | ................. | B25H 3/023 292/205 |
| 5,199,592 A * | 4/1993 | Reiland | .............. | B65D 11/1833 220/817 |
| 5,281,045 A * | 1/1994 | Ichikawa | ................ | F16B 7/105 403/325 |
| 7,503,569 B2 * | 3/2009 | Duvigneau | .............. | B25H 3/00 190/110 |
| 7,854,321 B2 * | 12/2010 | Twig | ...................... | B25H 3/023 206/483 |
| D637,001 S * | 5/2011 | Vilkomirski | ................... | D7/318 |
| 8,210,387 B2 * | 7/2012 | Twig | ...................... | B25H 3/022 220/521 |
| 8,210,579 B2 * | 7/2012 | Vilkomirski | .............. | E05C 3/14 292/DIG. 31 |
| D674,605 S * | 1/2013 | Vilkomirski | ................... | D3/905 |
| 8,505,729 B2 * | 8/2013 | Sosnovsky | ............. | B65D 45/22 220/756 |
| 8,567,796 B2 * | 10/2013 | Bar-Erez | ................... | B62B 1/04 280/47.26 |
| D694,522 S * | 12/2013 | Horovitz | ........................ | D3/297 |
| 8,657,307 B2 * | 2/2014 | Lifshitz | .................... | B25H 3/02 280/47.17 |
| 8,813,960 B2 * | 8/2014 | Fjelland | ............... | B65D 21/023 220/4.27 |
| 8,915,504 B1 * | 12/2014 | Seibert | .................... | B62B 3/005 280/47.35 |
| 8,944,537 B1 * | 2/2015 | Manalang | .............. | B25H 3/028 312/319.2 |

(Continued)

*Primary Examiner* — Steven A. Reynolds
*Assistant Examiner* — Prince Pal
(74) *Attorney, Agent, or Firm* — LANWAY IPR SERVICES; Chun-Ming Shih

(57) ABSTRACT

A tool box assembly includes a first body, a first receiving portion, two first locking units, a second body, three second locking units, a third locking unit, and a fourth locking unit. The first receiving portion is provided with a first receiving recess and an opening. Each of the first locking units is provided with a projecting piece, at least one first locking portion, and a first restriction portion. Each of the second locking units is provided with a second receiving recess and a second locking portion. The third locking unit is locked on the first locking units. The fourth locking unit is mounted on the first receiving portion and locked on one of the second locking units. The fourth locking unit is driven to be detached from the second locking units.

10 Claims, 15 Drawing Sheets

(56) References Cited

U.S. PATENT DOCUMENTS

| | | | |
|---|---|---|---|
| 9,132,543 B2* | 9/2015 | Bar-Erez | B62B 1/04 |
| 9,193,060 B2* | 11/2015 | Ben-Gigi | B65D 25/2867 |
| D744,750 S* | 12/2015 | Sabbag | D3/905 |
| 9,616,562 B2* | 4/2017 | Hoppe | B25H 3/02 |
| 9,616,563 B2* | 4/2017 | Vilkormirski | B25H 3/023 |
| D798,053 S* | 9/2017 | Shitrit | D3/276 |
| 9,796,076 B2* | 10/2017 | Baruch | B25H 3/023 |
| 10,022,856 B2* | 7/2018 | Bensman | B25H 3/028 |
| RE47,022 E* | 9/2018 | Sosnovsky | B65D 45/22 |
| 10,160,471 B2* | 12/2018 | Yahav | B62B 5/065 |
| D851,929 S* | 6/2019 | Shpitzer | D3/276 |
| D857,388 S* | 8/2019 | Shpitzer | D3/905 |
| 10,434,638 B1 | 10/2019 | Tsai | |
| 10,575,417 B2* | 2/2020 | Sabbag | B65D 21/0217 |
| 11,059,631 B1* | 7/2021 | Brunner | B65D 21/0217 |
| 11,155,382 B1* | 10/2021 | Cai | B65D 21/0223 |
| 11,185,974 B2* | 11/2021 | Omry | B25H 3/02 |
| 11,279,518 B2* | 3/2022 | Kögel | B25H 3/02 |
| 11,426,859 B2* | 8/2022 | Squiers | A45C 13/02 |
| 11,485,542 B2* | 11/2022 | Brunner | B65D 21/0212 |
| D985,937 S* | 5/2023 | Bullock | D3/276 |
| 11,780,075 B2* | 10/2023 | Barton | A45C 13/02 |
| | | | 206/372 |
| 11,840,269 B2* | 12/2023 | Brunner | B62B 1/002 |
| 11,912,477 B2* | 2/2024 | Miller | B65D 43/167 |
| 11,919,145 B2* | 3/2024 | Karlsson | B62B 1/12 |
| D1,022,612 S* | 4/2024 | Zhou | D7/703 |
| 11,965,541 B2* | 4/2024 | Baruch | B25H 3/02 |
| 11,976,498 B2* | 5/2024 | Seiders | B65D 55/02 |
| 11,986,946 B2* | 5/2024 | Zhang | B25H 3/026 |
| 2003/0094392 A1* | 5/2003 | Meier | B65D 21/0213 |
| | | | 206/503 |
| 2003/0147691 A1* | 8/2003 | Ho | B62J 9/23 |
| | | | 403/322.1 |
| 2005/0155889 A1* | 7/2005 | Lown | A01K 97/06 |
| | | | 206/501 |
| 2007/0222231 A1* | 9/2007 | Vilkomirski | B25H 3/02 |
| | | | 292/226 |
| 2009/0263187 A1* | 10/2009 | Lee | B25C 5/1665 |
| | | | 403/330 |
| 2010/0224527 A1* | 9/2010 | Huang | B25H 3/028 |
| | | | 206/503 |
| 2010/0290877 A1* | 11/2010 | Landau | B25H 3/028 |
| | | | 414/490 |
| 2010/0320108 A1* | 12/2010 | Riedel | E05B 65/5276 |
| | | | 206/372 |
| 2011/0049824 A1* | 3/2011 | Bar-Erez | B25H 3/028 |
| | | | 280/47.26 |
| 2011/0139666 A1* | 6/2011 | Sosnovsky | B25H 3/021 |
| | | | 206/508 |
| 2012/0024739 A1* | 2/2012 | Fjelland | F16B 45/036 |
| | | | 403/321 |
| 2012/0168444 A1* | 7/2012 | Shitrit | B25H 3/02 |
| | | | 220/324 |
| 2013/0118818 A1* | 5/2013 | Smith | B25H 1/04 |
| | | | 280/30 |
| 2014/0070677 A1* | 3/2014 | Baruch | E05B 65/467 |
| | | | 312/216 |
| 2014/0319147 A1* | 10/2014 | Horovitz | B65D 43/163 |
| | | | 220/845 |
| 2015/0151427 A1* | 6/2015 | Ben-Gigi | B65D 21/0228 |
| | | | 220/4.27 |
| 2015/0274362 A1* | 10/2015 | Christopher | B65D 21/0219 |
| | | | 206/506 |
| 2016/0144500 A1* | 5/2016 | Chen | B65D 21/023 |
| | | | 206/349 |
| 2017/0066124 A1* | 3/2017 | Baruch | B65D 43/16 |
| 2017/0121056 A1* | 5/2017 | Wang | B65D 21/0228 |
| 2017/0158216 A1* | 6/2017 | Yahav | B62B 5/0013 |
| 2017/0165828 A1* | 6/2017 | Fleischmann | B65D 85/00 |
| 2018/0044059 A1* | 2/2018 | Brunner | B25H 3/02 |
| 2018/0161975 A1* | 6/2018 | Brunner | B25H 3/02 |
| 2019/0001482 A1* | 1/2019 | Wolle | B25H 3/02 |
| 2019/0168376 A1* | 6/2019 | Brocket | B25H 3/021 |
| 2019/0232484 A1* | 8/2019 | Ender | B25H 3/006 |
| 2020/0025229 A1* | 1/2020 | Baruch | B25H 3/02 |
| 2020/0298392 A1* | 9/2020 | Baruch | B25H 3/02 |
| 2021/0155373 A1* | 5/2021 | Cai | B65D 21/0212 |
| 2021/0221561 A1* | 7/2021 | Davidian | B65D 21/0224 |
| 2021/0291954 A1* | 9/2021 | Antoine | B64C 1/14 |
| 2022/0396985 A1* | 12/2022 | Li | E05C 19/063 |
| 2023/0122425 A1* | 4/2023 | Camp | B25H 3/021 |
| 2023/0202025 A1* | 6/2023 | Chen | B25H 3/02 |
| | | | 206/503 |
| 2024/0149934 A1* | 5/2024 | Panosian | B25H 3/021 |
| 2024/0150071 A1* | 5/2024 | Panosian | B65D 25/20 |
| 2024/0150079 A1* | 5/2024 | Panosian | B65D 21/0223 |
| 2024/0150094 A1* | 5/2024 | Panosian | B62B 1/26 |
| 2024/0208040 A1* | 6/2024 | Coons | B25H 3/023 |
| 2024/0351744 A1* | 10/2024 | Tonelli | B25H 3/02 |
| 2024/0359311 A1* | 10/2024 | Chen | B65D 21/0201 |
| 2025/0107622 A1* | 4/2025 | Baruch | B25H 3/028 |
| 2025/0153903 A1* | 5/2025 | Maier | B65D 43/22 |
| 2025/0197057 A1* | 6/2025 | Omry | B25H 1/04 |

* cited by examiner

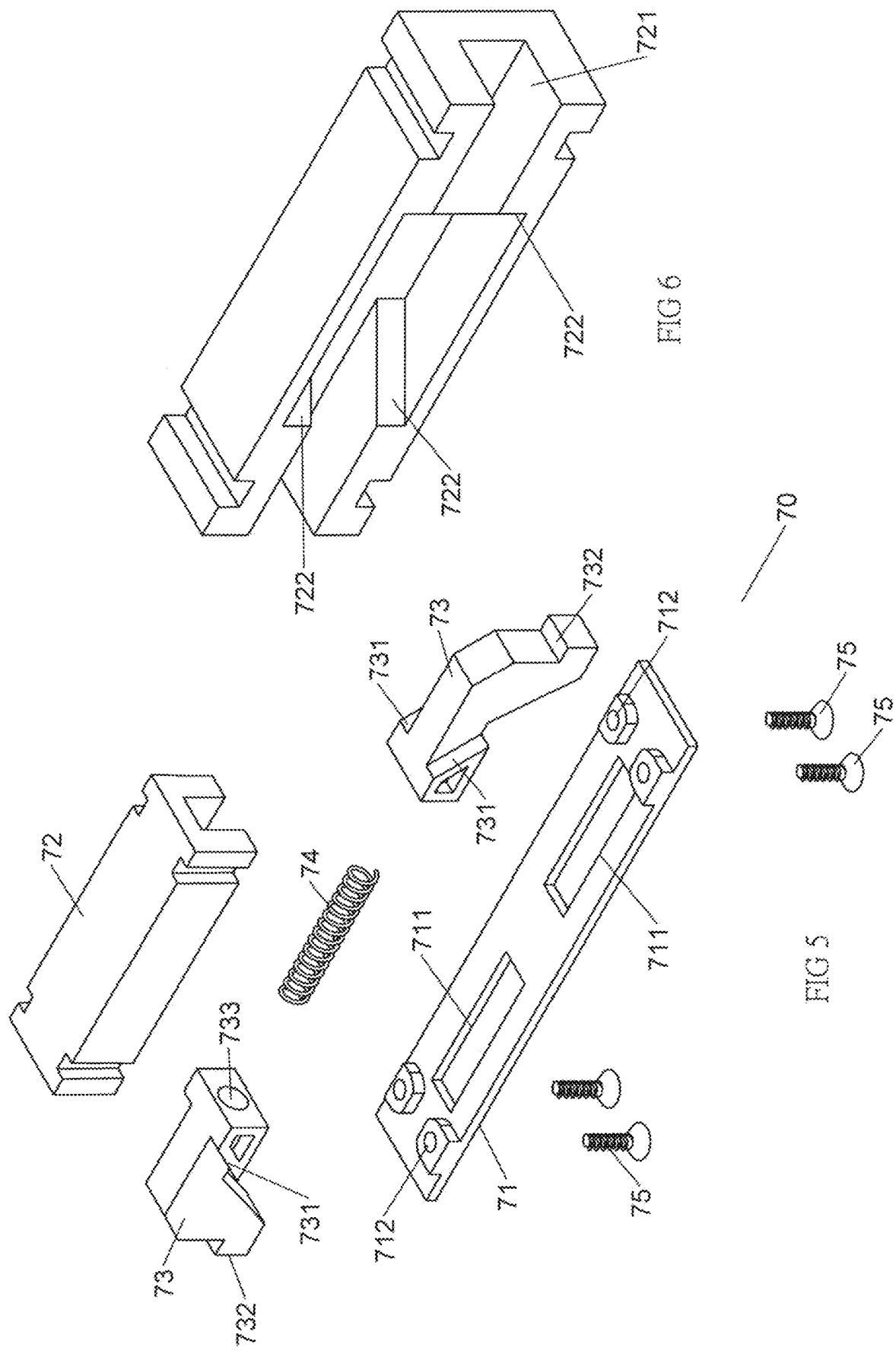

TOOL BOX ASSEMBLY

BACKGROUND OF THE INVENTION

Field of the Invention

The present invention relates to a tool box or a tool box assembly.

Description of the Related Art

A conventional tool box assembly was disclosed in the applicant's U.S. Pat. No. 10,434,638, and comprises multiple tool boxes 1. Each of the tool boxes includes a body 10, a cover 20, and two connectors 30.

However, the conventional tool box assembly has the following disadvantages.

1. When the tool boxes 1 are to be stacked, the engaging portion 15 of one of the tool boxes 1 is received in the room 25 of another one of the tool boxes 1. Thus, each of the tool boxes 1 is stacked on another one of the tool boxes 1 and cannot be assembled with and stacked on a tool box with different sizes, thereby limiting the versatility of the conventional tool box assembly.
2. Referring to FIG. 7, the tool boxes are stacked. When the connectors 30 of one of the tool boxes are snapped onto the blocks 13, the connectors 30 also restrict the insertion plates 14 of another one of the tool boxes to prevent the insertion plates 14 from being detached from the notches 24. The connectors 30 only slide leftward or rightward.

BRIEF SUMMARY OF THE INVENTION

In accordance with the present invention, there is provided a tool box assembly comprising multiple tool boxes. Each of the tool boxes includes a first body, a first receiving portion, two first locking units, a second body, three second locking units, a third locking unit, and a fourth locking unit. The first receiving portion is mounted on the first body and is provided with a first receiving recess and an opening. Each of the two first locking units is provided with a projecting piece, at least one first locking portion, and a first restriction portion. Each of the three second locking units is provided with a second receiving recess and a second locking portion. The third locking unit is locked on the two first locking units. The fourth locking unit is mounted on the first receiving portion and locked on one of the three second locking units. The fourth locking unit is driven to be detached from the three second locking units. Thus, the first body and the second body are moved mutually or are not moved mutually by control of the fourth locking unit and the three second locking units, so that the two first locking units and the third locking unit are detached mutually or are not detached mutually.

According to the primary advantage of the present invention, the at least one first locking portion is locked on the at least one third locking portion and the fourth locking portion, and the first restriction portions of the two first locking units are locked on two of the three second restriction portions. In addition, the fourth locking unit is locked by one of the three second locking units. Thus, the tool box assembly includes at least two locking mechanisms so that the first body and the second body are assembled exactly.

According to another advantage of the present invention, the tool box assembly is available two dimensions of width. When the first body and the second body have a standard width, the middle one of the three second locking units is assembled with the fourth locking unit. Alternatively, a side one of the three second locking units on the second body having a standard width is assembled with the fourth locking unit on the first body having a half width. Thus, the first body and the second body having two different dimensions of width can be assembled and stacked.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

FIG. 5 is an exploded perspective view of a fourth locking unit of the tool box assembly in accordance with the preferred embodiment of the present invention.

FIG. 6 is a perspective view of a second block of the fourth locking unit as shown in FIG. 5.

DETAILED DESCRIPTION OF THE INVENTION

Figure 1:
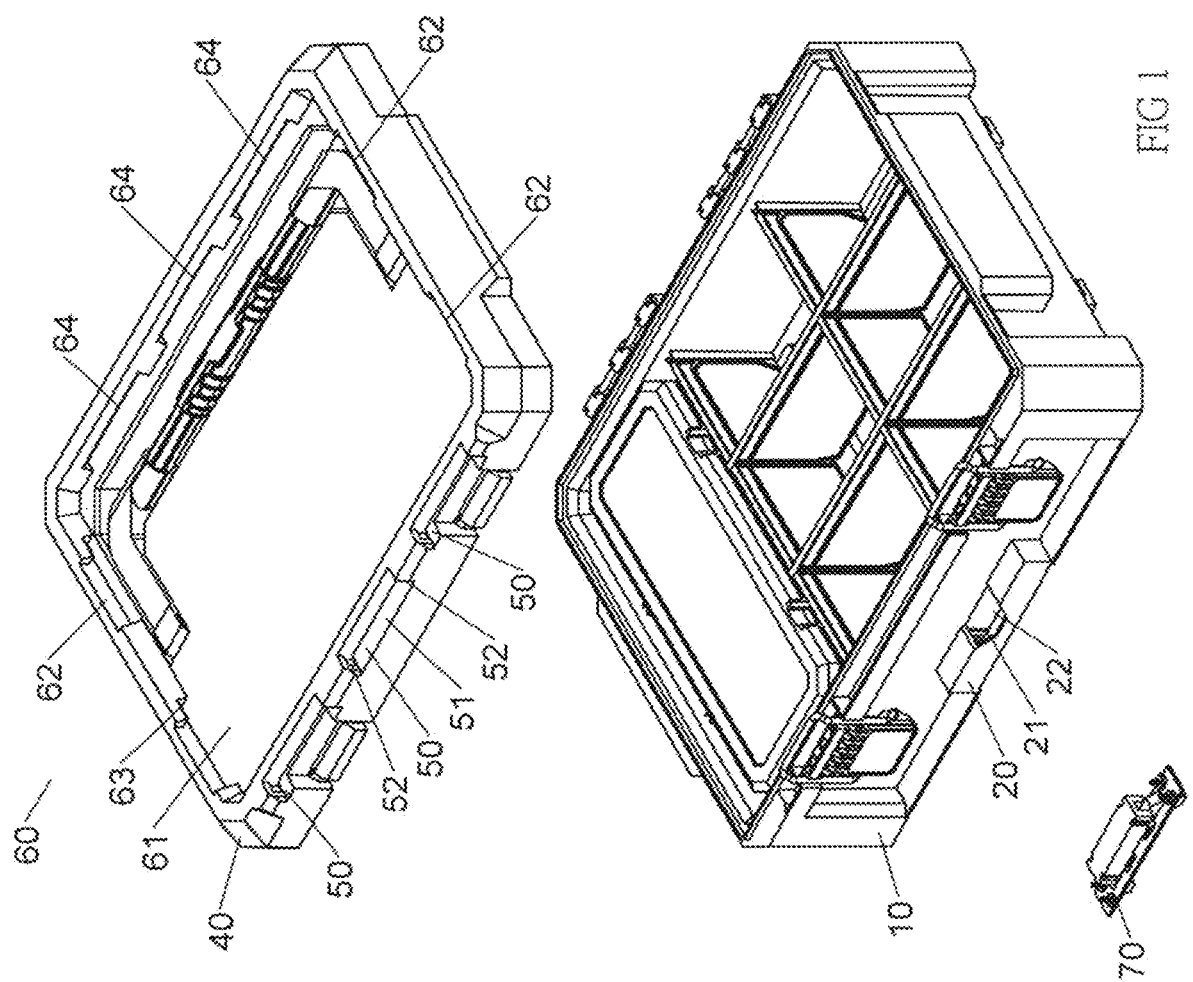
FIG. 1 is an exploded perspective view of a tool box assembly in accordance with the preferred embodiment of the present invention.
Figure 2:
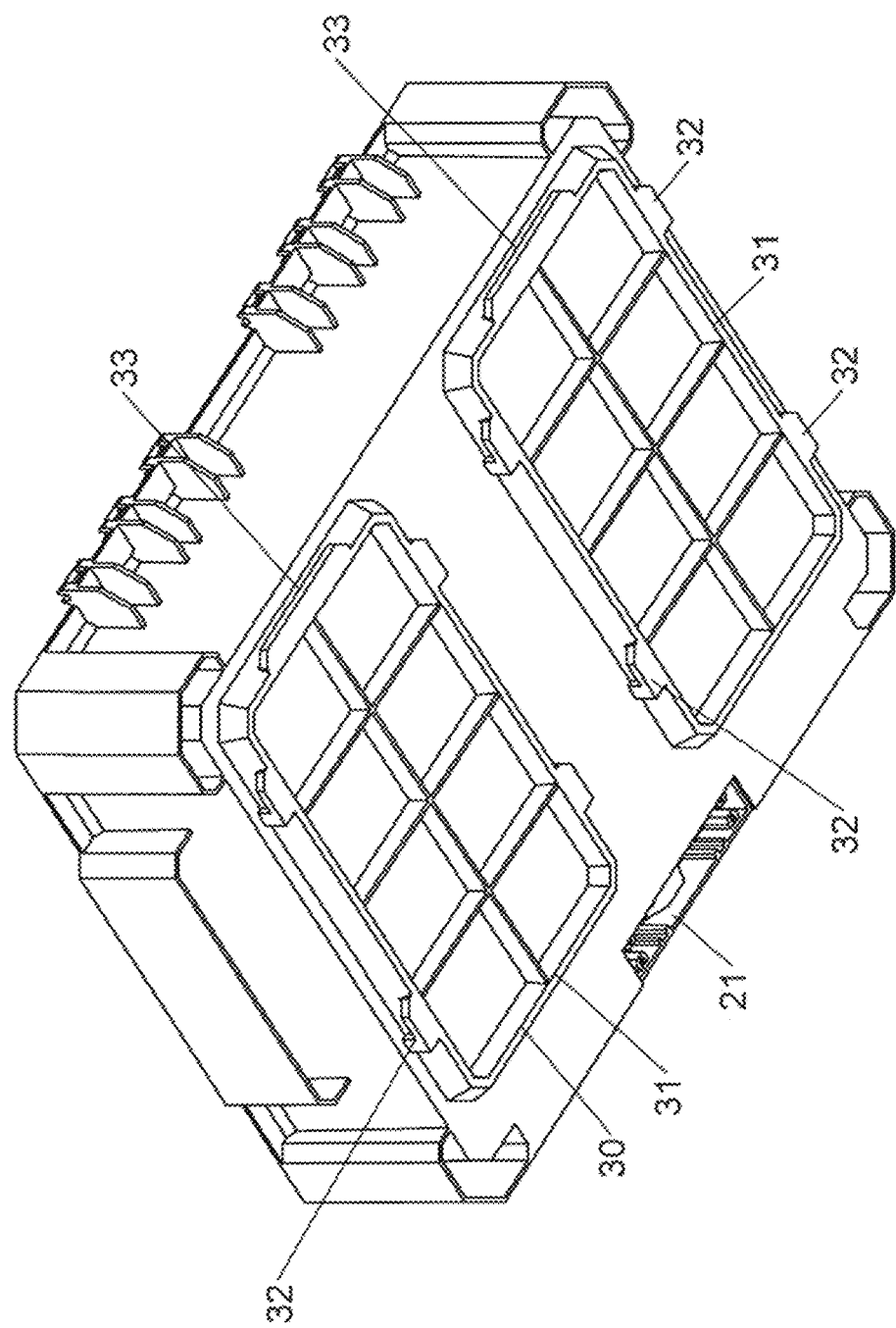
FIG. 2 is a perspective view of a first body of the tool box assembly in accordance with the preferred embodiment of the present invention.
Figure 3:
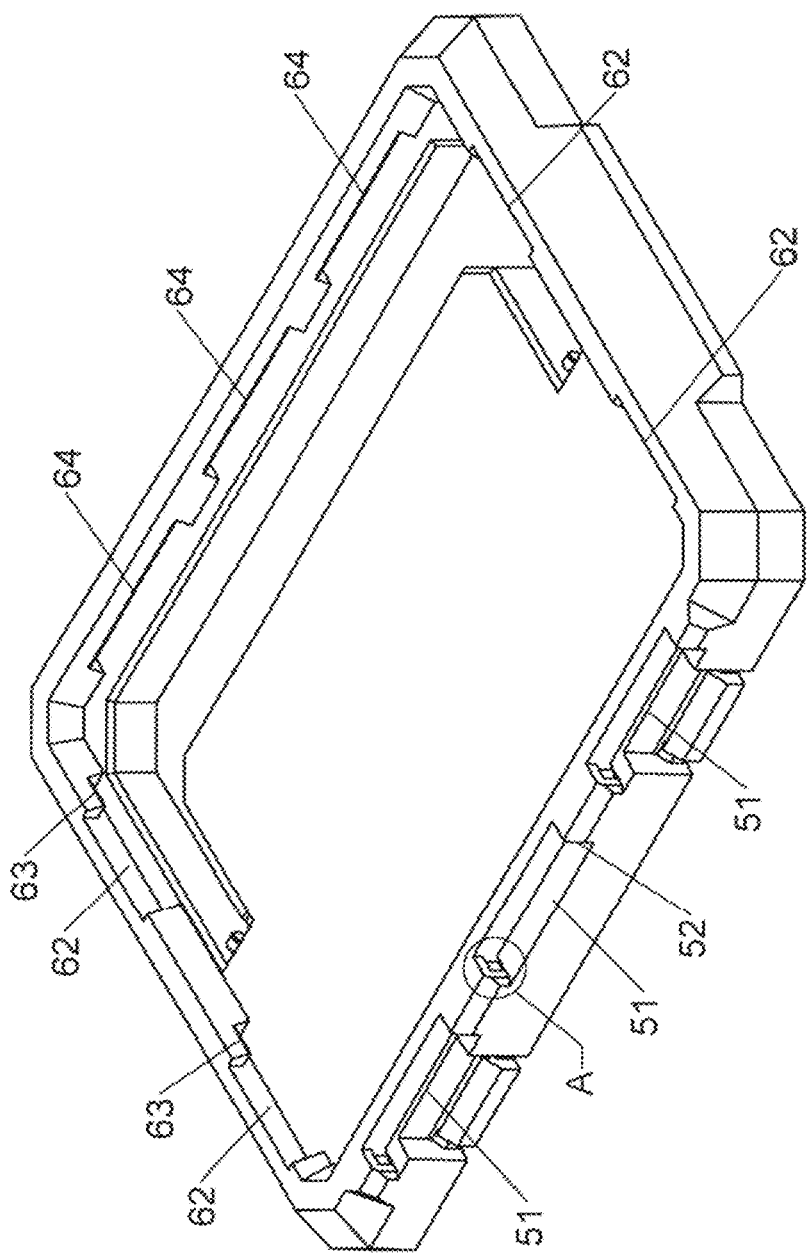
FIG. 3 is a partial perspective view of the tool box assembly in accordance with the preferred embodiment of the present invention.
Figure 4:
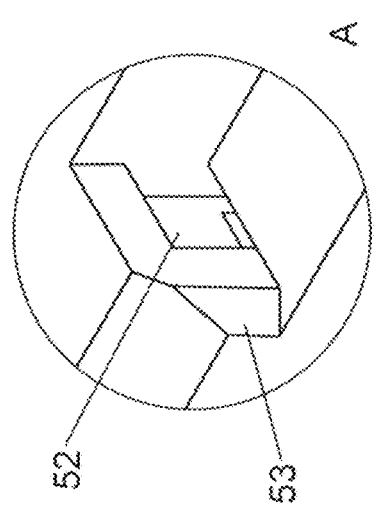
FIG. 4 is a locally enlarged view of the tool box assembly taken along circle A as shown in FIG. 3.

Referring to the drawings and initially to FIGS. 1-5, a tool box assembly in accordance with the preferred embodiment of the present invention comprises multiple tool boxes. Each of the tool boxes includes a first body 10, a first receiving portion (or mounting seat) 20, two first locking units 30, a second body 40, three second locking units 50, a third locking unit 60, and a fourth locking unit 70.

The first body 10 has a shape of a case or box and is used to receive and store hand tools. Preferably, the first body 10 is a tool box structure or tool case structure or cabinet.

The first receiving portion 20 is mounted on the first body 10. The first receiving portion 20 is located at a middle position of a front side of the first body 10. The first receiving portion 20 and the first body 10 are formed integrally. The first receiving portion 20 is provided with a first receiving recess 21 having an open bottom. The first receiving portion 20 is provided with an opening 22 connected to the first receiving recess 21. The opening 22 is directed upward.

The two first locking units 30 are mounted on a bottom of the first body 10. Each of the two first locking units 30 is provided with a projecting piece (or lug) 31. The projecting piece 31 has a grid shape with ribs. The projecting piece 31 has two sides each provided with at least one first locking portion 32. The at least one first locking portion 32 is an L-shaped projection. The projecting piece 31 has another side provided with a first restriction portion 33 misaligning with the first receiving portion 20. The first restriction portion 33 is an elongate piece. The first locking portions 32 at the two sides of the projecting piece 31 and the first restriction portion 33 are arranged at three sides of the projecting piece 31.

The second body 40 is assembled with the first body 10, covers the first body 10, or is pivotally connected with the first body 10. The second body 40 and the first body 10 are opened or closed. The second body 40 is a cover or cap. The second body 40 has a shape matching that of the first body 10.

The three second locking units 50 are mounted on a side of the second body 40 and are arranged linearly. A middle one of the three second locking units 50 aligns with the first receiving portion 20, and other two of the three second locking units 50 misalign with the first receiving portion 20 and align with the first restriction portions 33 of the two first locking units 30. Each of the three second locking units 50 is provided with a second receiving recess 51. The second receiving recess 51 is an elongate open slot. The second receiving recess 51 has two sides each provided with a second locking portion 52. The second locking portion 52 is a groove. The second receiving recess 51 has an open front having two sides each provided with a first inclined face 53. The first inclined face 53 expands outward from the second receiving recess 51 and aligns with the second locking portion 52.

The third locking unit 60 is locked on the two first locking units 30 so that the second body 40 and the first body 10 are assembled and cannot be detached from each other.

The third locking unit 60 is provided with a receiving space 61 receiving the two first locking units 30. The receiving space 61 of the third locking unit 60 is provided on a top face of the second body 40. The receiving space 61 has two sides each provided with at least one third locking portion 62. The at least one third locking portion 62 has a side provided with a fourth locking portion 63 connected to the at least one third locking portion 62. The at least one third locking portion 62 and the fourth locking portion 63 align with the at least one first locking portion 32. The at least one third locking portion 62 and the fourth locking portion 63 are locked on the at least one first locking portion 32. In assembly, the at least one first locking portion 32 is initially introduced into the at least one third locking portion 62 and then inserted into and locked in the fourth locking portion 63. The at least one third locking portion 62 and the fourth locking portion 63 form an L-shaped groove.

The receiving space 61 has another side provided with three second restriction portions 64 for receiving and locking the first restriction portion 33. Two of the three second restriction portions 64 are locked on the first restriction portions 33 of the two first locking units 30. The three second restriction portions 64 and the three second locking units 50 have the same number. The three second restriction portions 64 are opposite to the three second locking units 50. The three second restriction portions 64 are spaced from each other and are arranged linearly. Each of the three second restriction portions 64 is an elongate slot.

The fourth locking unit 70 is mounted on the first receiving portion 20 or mounted in the first receiving recess 21. The fourth locking unit 70 is locked on one of the three second locking units 50. When the fourth locking unit 70 is driven or pressed, the fourth locking unit 70 is controlled to be detached from the three second locking units 50. Thus, the first body 10 and the second body 40 are moved mutually or are not moved mutually by control of the fourth locking unit 70 and the three second locking units 50, so that the two first locking units 30 and the third locking unit 60 are detached mutually or are not detached mutually. The fourth locking unit 70 includes a first block 71, a second block 72, two third blocks 73, and an elastic member 74.

The first block 71 is an elongate sheet plate. The first block 71 is provided with two slots 711 spaced from each other. Each of the two slots 711 has a rectangular hollow shape. The first block 71 is provided with four through holes 712 arranged at four corners of the first block 71. The four through holes 712 are located outside of the two slots 711.

The second block 72 has a cuboid shape. The second block 72 is received in the first receiving recess 21 and partially protrudes from the opening 22. The second block 72 is pressed and moved through the opening 22. The second block 72 is spaced from the first block 71 with an interval. The second block 72 is provided with a channel 721 transversely extending through the second block 72. The second block 72 is provided with four second inclined faces 722 arranged in the channel 721. The four second inclined faces 722 form a trapezoid (or trapezium) groove.

The two third blocks 73 are opposite to each other relative to the second block 72. The two third blocks 73 are received in the channel 721. The two third blocks 73 are transversely moved in the channel 721 synchronously. Each of the two third blocks 73 has a first end provided with two third inclined faces 731 slidably abutting two of the four second inclined faces 722. Each of the two third blocks 73 has a second end provided with a fifth locking portion 732 protruding from one of the two slots 711. The fifth locking portion 732 is locked on the second locking portion 52 of one of the three second locking units 50. Each of the two third blocks 73 is provided with a receiving hole 733 close to the two third inclined faces 731. The receiving holes 733 of the two third blocks 73 face each other.

The elastic member 74 is elastically biased in the receiving hole 733 of each of the two third blocks 73 and is compressed by movement of the two third blocks 73 to provide a restoring force to the two third blocks 73.

The fourth locking unit 70 further includes four screw (or fastening) members 75 extending through the four through holes 712 and screwed into the first receiving recess 21 of the first receiving portion 20, so that the fourth locking unit 70 is mounted in the first receiving recess 21.

Figure 7:
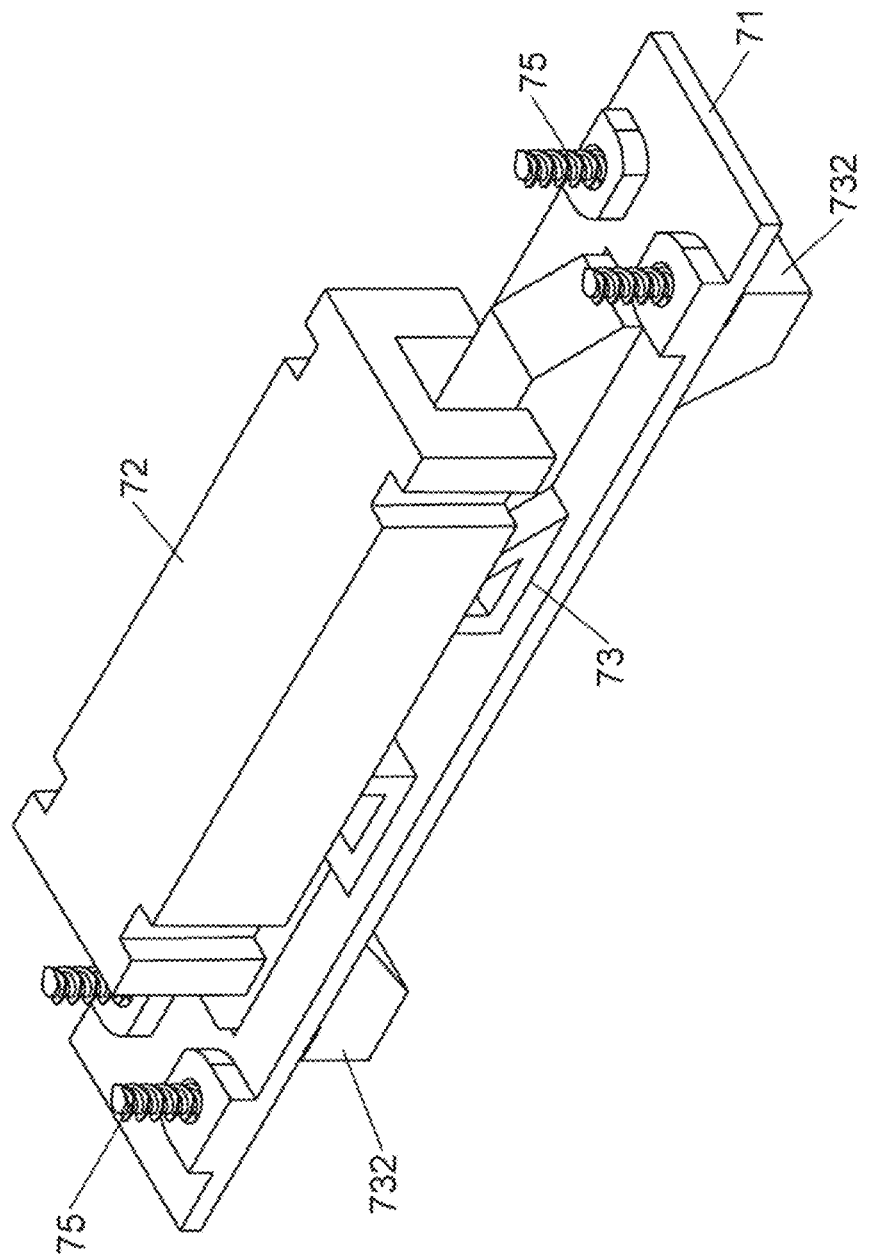
FIG. 7 is a perspective assembly view of the fourth locking unit as shown in FIG. 5.
Figure 8:
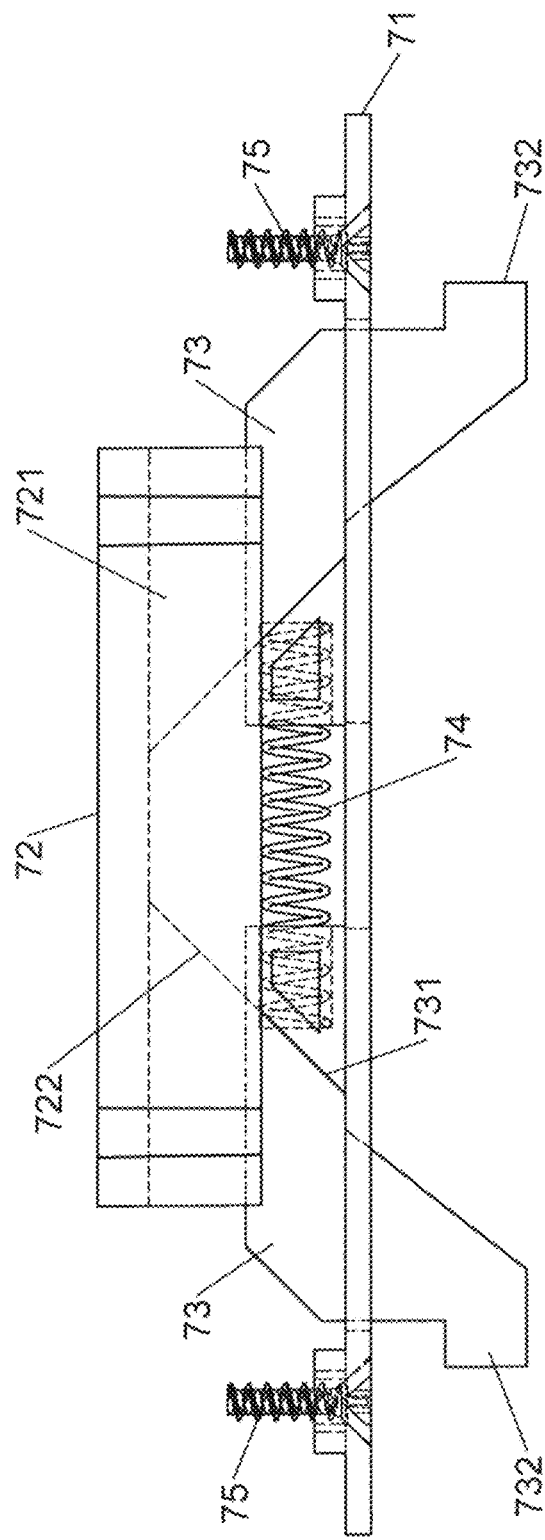
FIG. 8 is a front view of the fourth locking unit as shown in FIG. 7.
Figure 9:
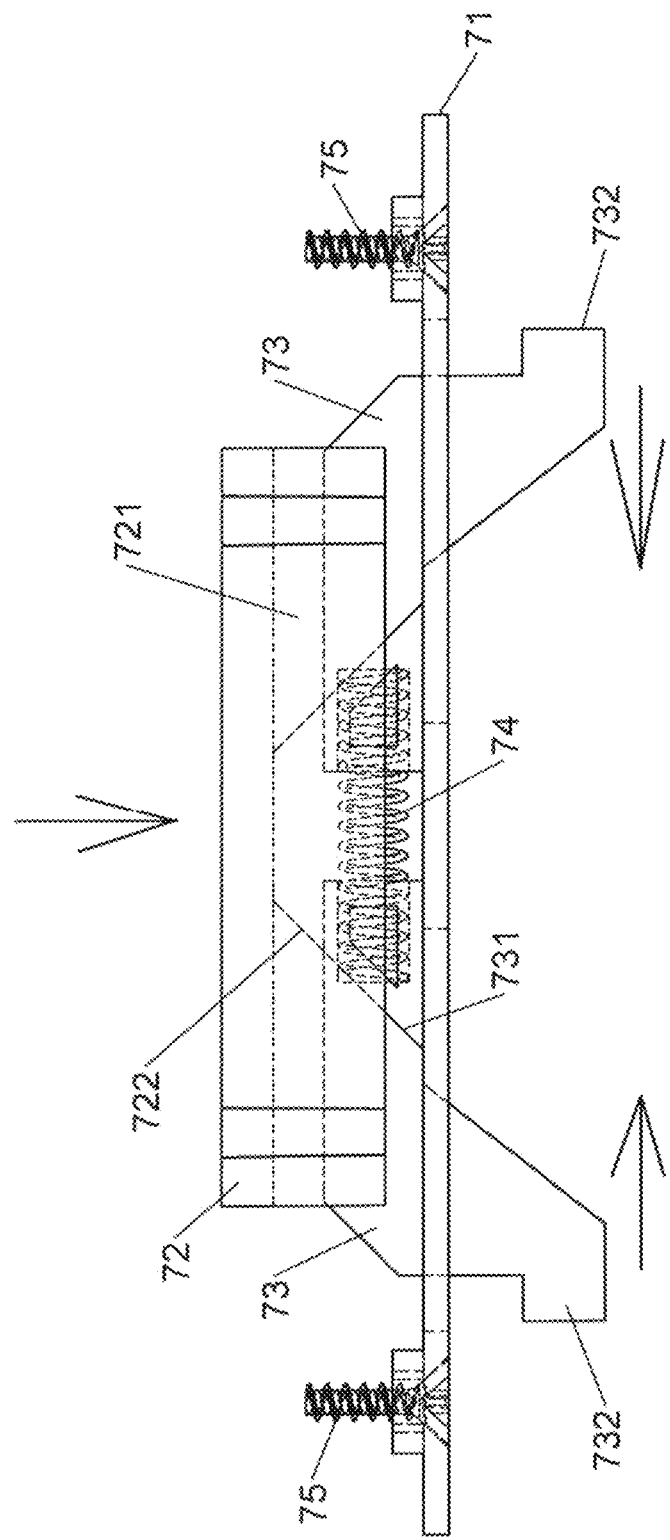
FIG. 9 is a schematic operational view of the fourth locking unit as shown in FIG. 8.

In operation, referring to FIGS. 7-9 with reference to FIGS. 1-6, the fourth locking unit 70 is assembled in the first receiving recess 21. The second block 72 is pressed through the opening 22 and moved in one direction. The two third inclined faces 731 are slidable on the two of the four second inclined faces 722. The second block 72 drives the two third blocks 73 to move relative to each other. The two third blocks 73 are moved toward each other so that the elastic member 74 is compressed. The fifth locking portion 732 is moved by each of the two third blocks 73 and detached and unlocked from the second locking portion 52 of one of the three second locking units 50 so that the fourth locking unit 70 is detached and unlocked from one of the three second locking units 50. The second block 72 is moved in a direction perpendicular to that of each of the two third blocks 73.

When the first body 10 is moved relative to the second body 40, the at least one first locking portion 32 of each of the two first locking units 30 is unlocked from the fourth locking portion 63 and retracted into the at least one third locking portion 62, and the first restriction portions 33 of the two first locking units 30 are unlocked from two of the three second restriction portions 64, so that the two first locking units 30 are detached from the third locking unit 60, and the first body 10 is removed from the second body 40.

When the first body 10 of one of the tool boxes is to be assembled with the second body 40 of another one of the tool boxes, it is unnecessary to press the fourth locking unit 70, and the first body 10 is placed on the three second locking units 50, so that the two first locking units 30 are inserted into and received in the third locking unit 60, the projecting piece 31 of each of the two first locking units 30 is received in the receiving space 61, the at least one first locking portion 32 of each of the two first locking units 30 is inserted into the at least one third locking portion 62, and the first restriction portions 33 of the two first locking units 30 align with two of the three second restriction portions 64. When the first body 10 is moved relative to the second body 40, the fifth locking portion 732 of each of the two third blocks 73 is guided by the first inclined face 53 and slides into the second receiving recess 51 of one of the three second locking units 50, the two third blocks 73 are pushed by the first inclined face 53 and moved toward each other, so that the fifth locking portion 732 of each of the two third blocks 73 is inserted into and locked by the second locking portion 52 of one of the three second locking units 50 by the restoring force of the elastic member 74, and the fourth locking unit 70 is locked by one of the three second locking units 50. When the first body 10 is further moved relative to the second body 40, the at least one first locking portion 32 of each of the two first locking units 30 is inserted into and locked by the fourth locking portion 63, and the first restriction portions 33 of the two first locking units 30 are inserted into and locked by two of the three second restriction portions 64, so that the two first locking units 30 are locked on the third locking unit 60, and the first body 10 of one of the tool boxes is stacked on the second body 40 of another one of the tool boxes.

Figure 10:
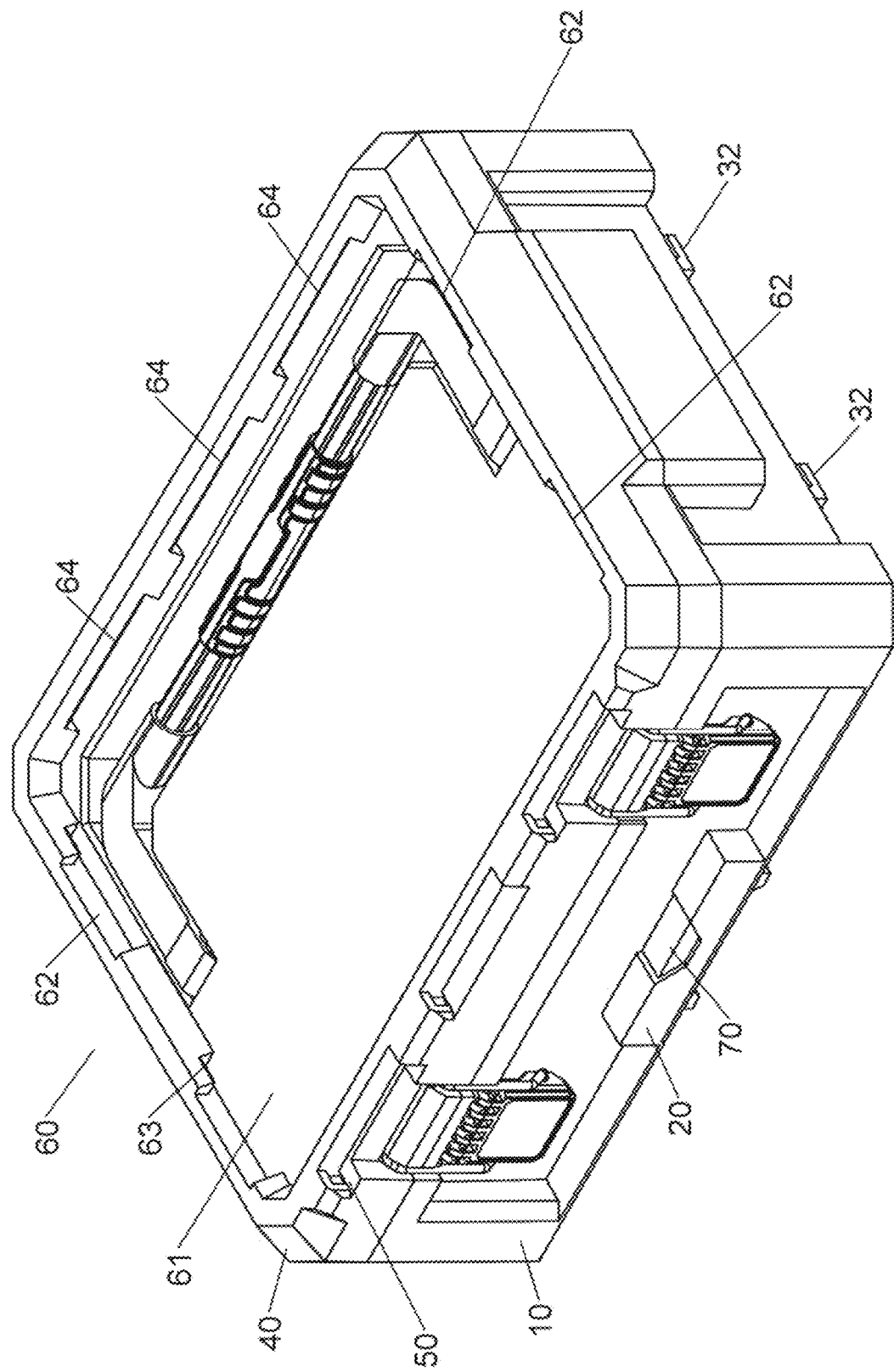
FIG. 10 is a perspective assembly view of the tool box assembly in accordance with the preferred embodiment of the present invention.

Referring to FIG. 10 with reference to FIGS. 1-9, the first body 10 and the second body 40 are assembled to be served as a single tool box. The at least one first locking portion 32 is locked by the at least one third locking portion 62 and the fourth locking portion 63, the first restriction portions 33 of the two first locking units 30 are locked by two of the three second restriction portions 64, and the fourth locking unit 70 is locked by one of the three second locking units 50. Thus, the tool box assembly has at least two different locking mechanisms. In addition, multiple first bodies 10 and multiple second bodies 40 are assembled and stacked to be served as a tool car.

Figure 11:
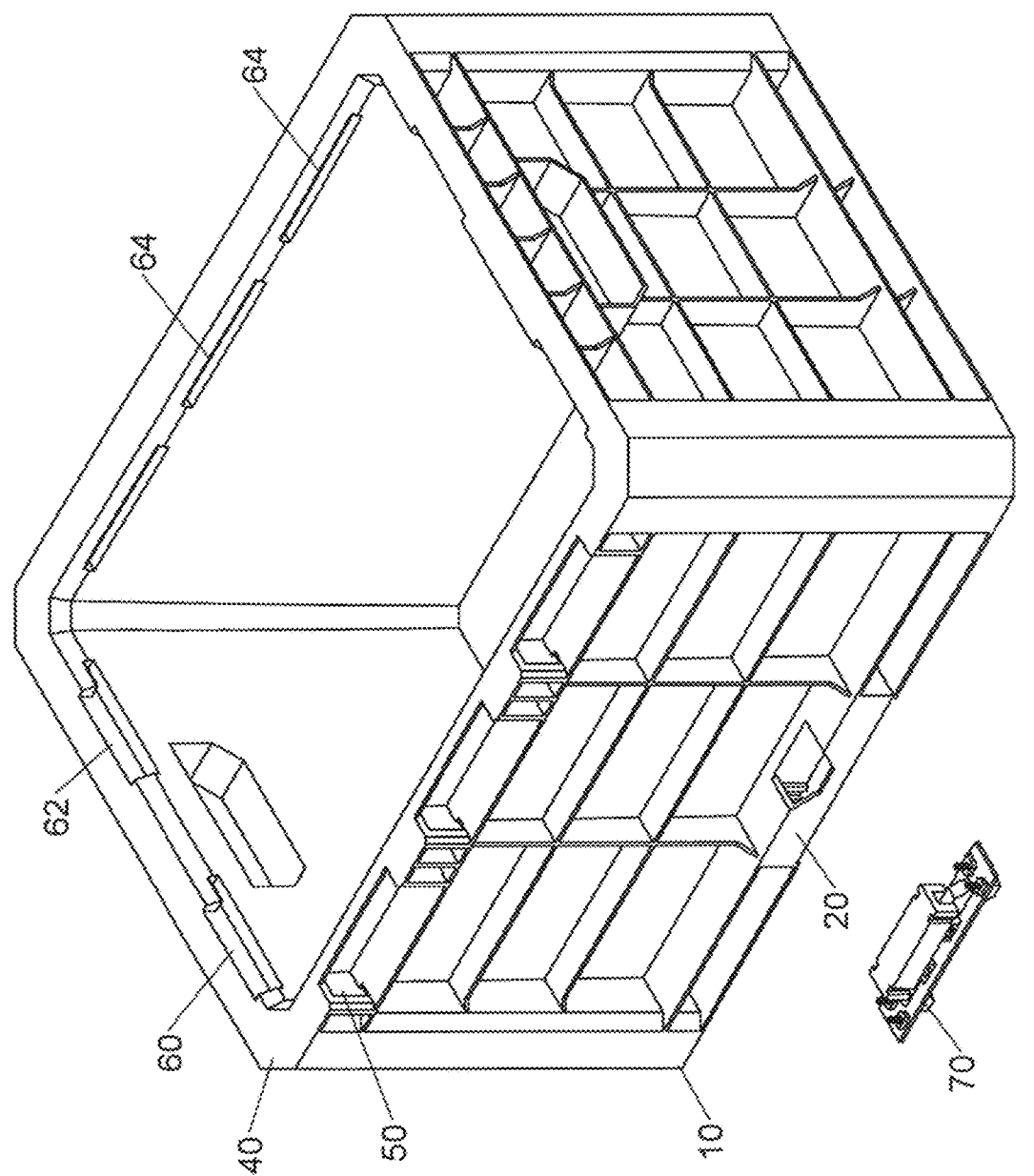
FIG. 11 is a partial exploded perspective view of a tool box assembly in accordance with the second preferred embodiment of the present invention.
Figure 12:
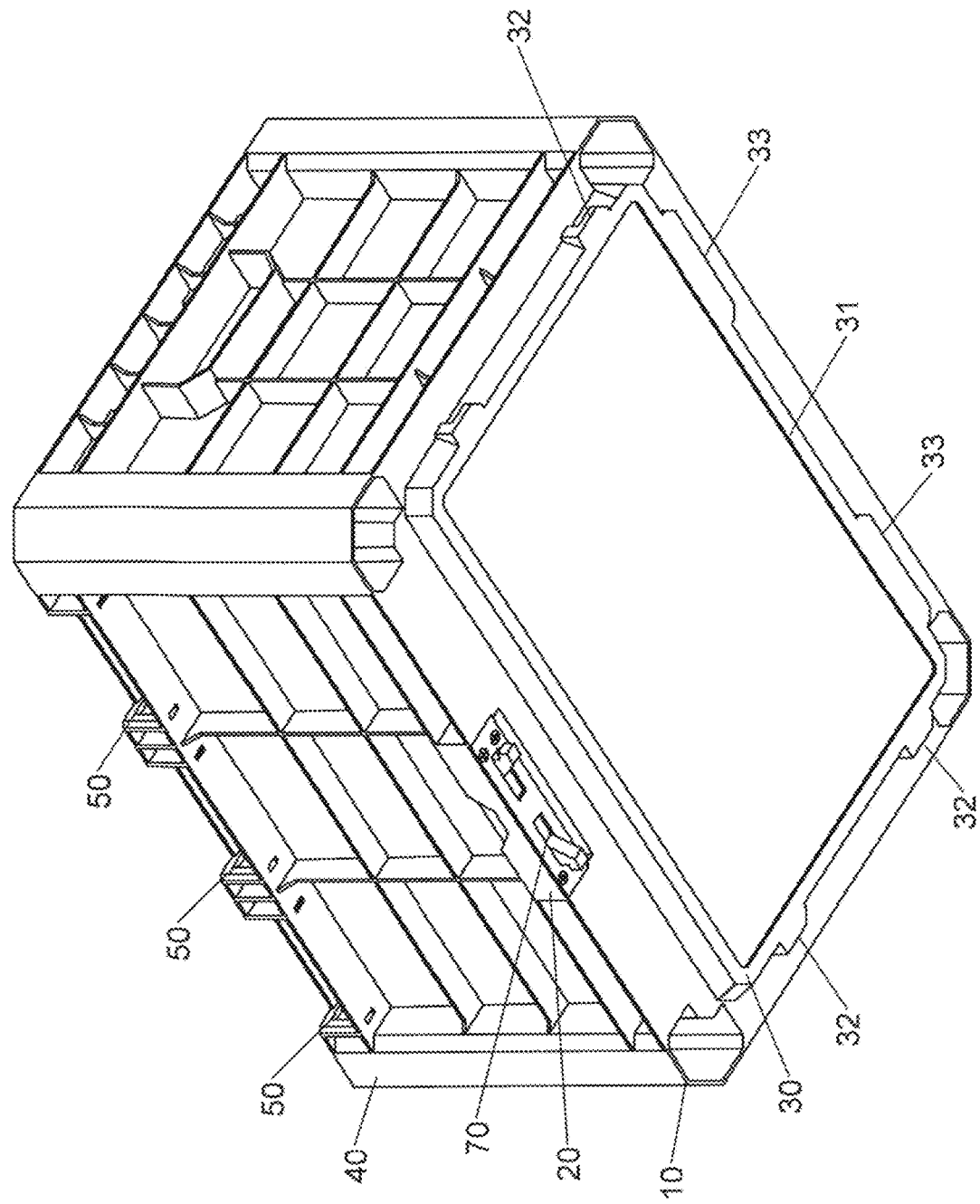
FIG. 12 is a perspective view of the tool box assembly in accordance with the second preferred embodiment of the present invention.

Referring to FIGS. 11 and 12, the first body 10 and the second body 40 are formed integrally. The third locking unit 60 is connected to an interior space of the first body 10. Each of the tool boxes only includes a first locking unit 30 which is provided with a projecting piece 31. The projecting piece 31 has a frame shape. The projecting piece 31 is provided with two first restriction portions 33. The two first restriction portions 33 of one of the tool boxes are locked on two of the three second restriction portions 64 of another one of the tool boxes. The fourth locking unit 70 of one of the tool boxes is locked by one of the three second locking units 50 of another one of the tool boxes.

Figure 13:
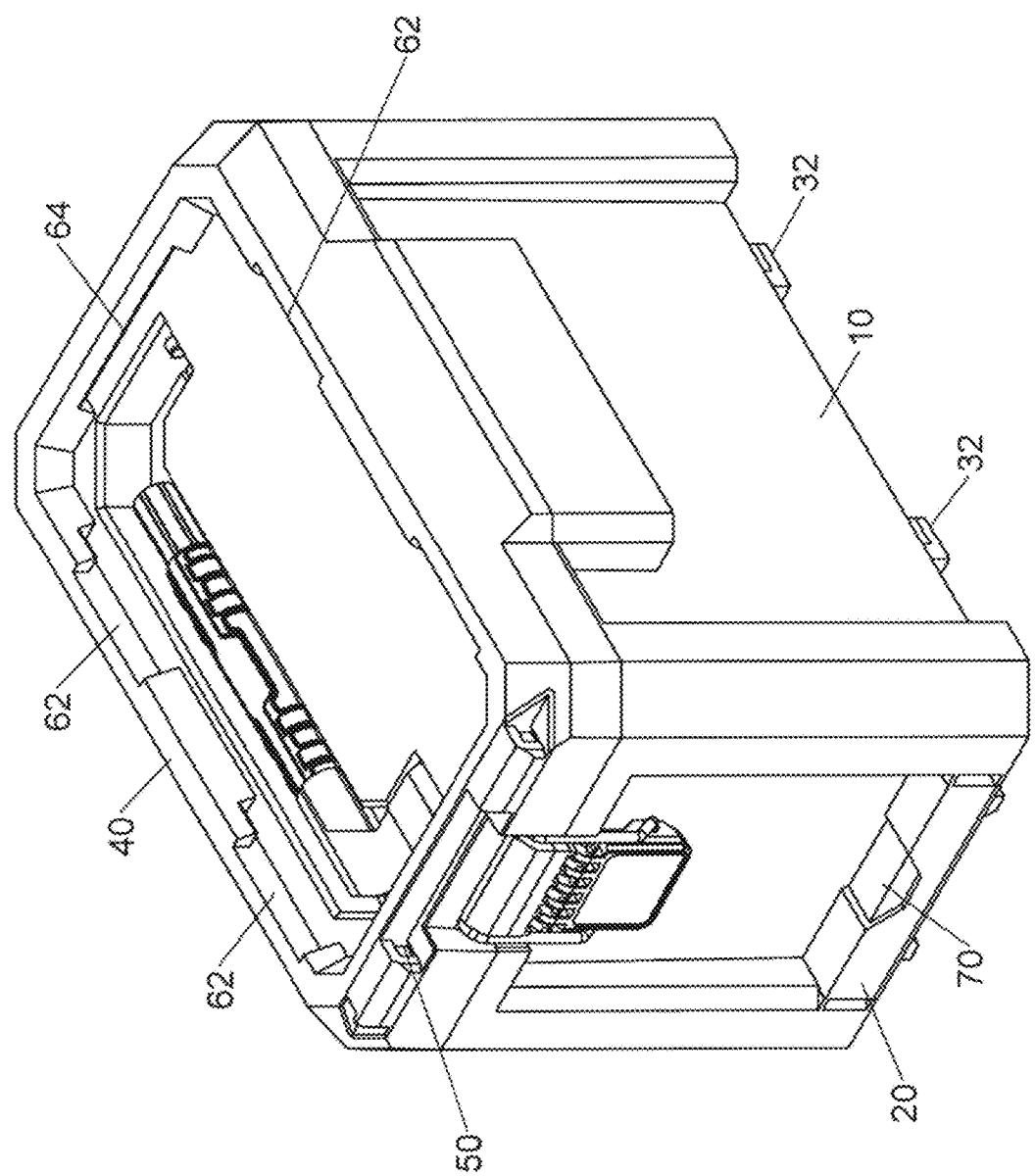
FIG. 13 is a perspective view of a tool box assembly in accordance with the third preferred embodiment of the present invention.

Referring to FIG. 13, the first body 10 is a narrow width case and has a half width of that as shown in FIG. 1, and the second body 40 has a half width of that as shown in FIG. 1. Each of the tool boxes only includes a second locking unit 50, and the third locking unit 60 is only provided with a second restriction portion 64. Thus, two first bodies 10 of a half width are juxtaposed to each other and are assembled on the second body 40 of a normal width, or two second bodies 40 of a half width are juxtaposed to each other and are assembled on the first body 10 of a normal width.

Figure 14:
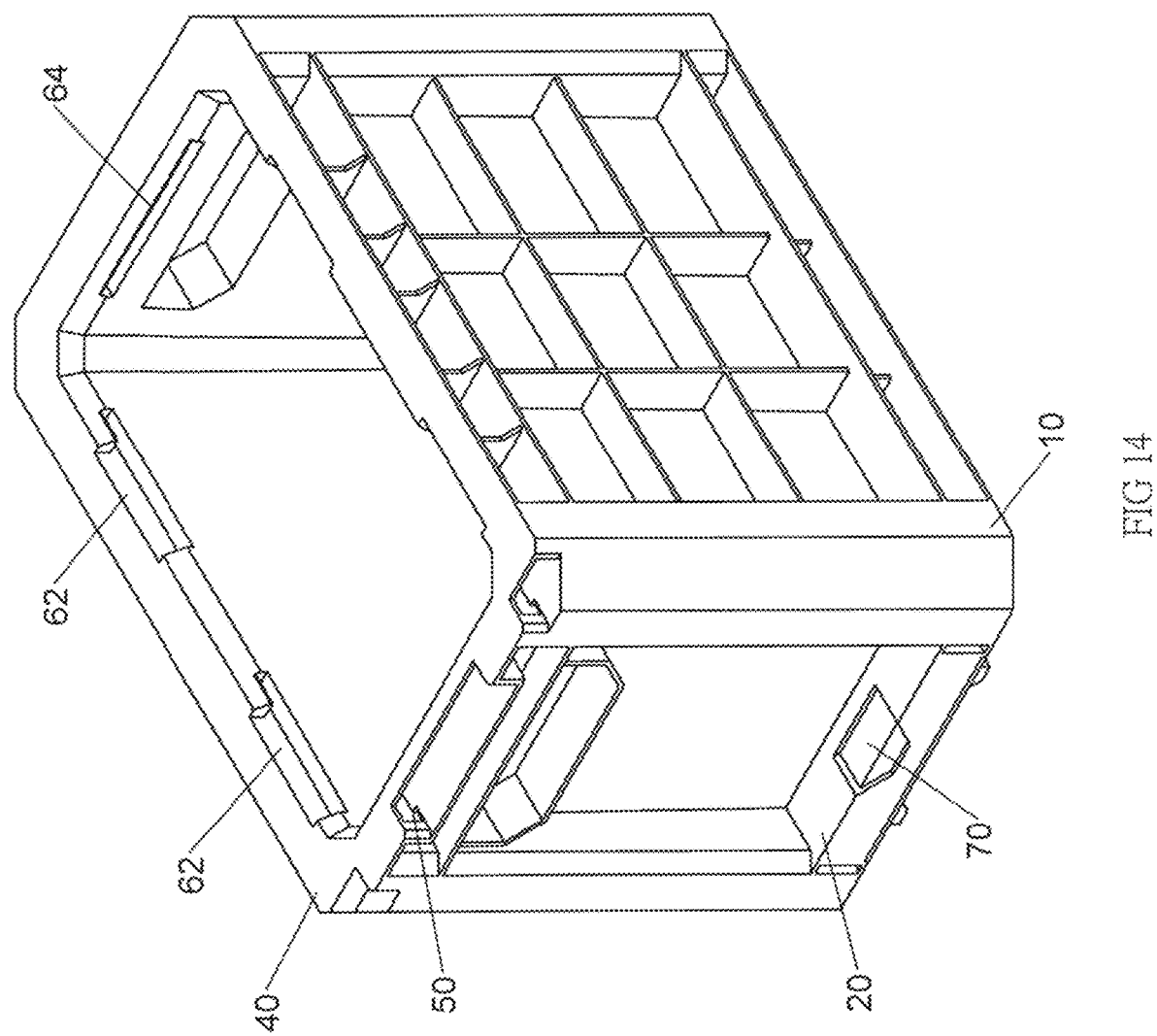
FIG. 14 is a perspective view of a tool box assembly in accordance with the fourth preferred embodiment of the present invention.

Referring to FIG. 14, the first body 10 is a narrow width case. The first body 10 and the second body 40 are formed integrally. Each of the tool boxes only includes a second locking unit 50, and the third locking unit 60 is only provided with a second restriction portion 64. The first body 10 has a side provided with a rib structure.

Figure 15:
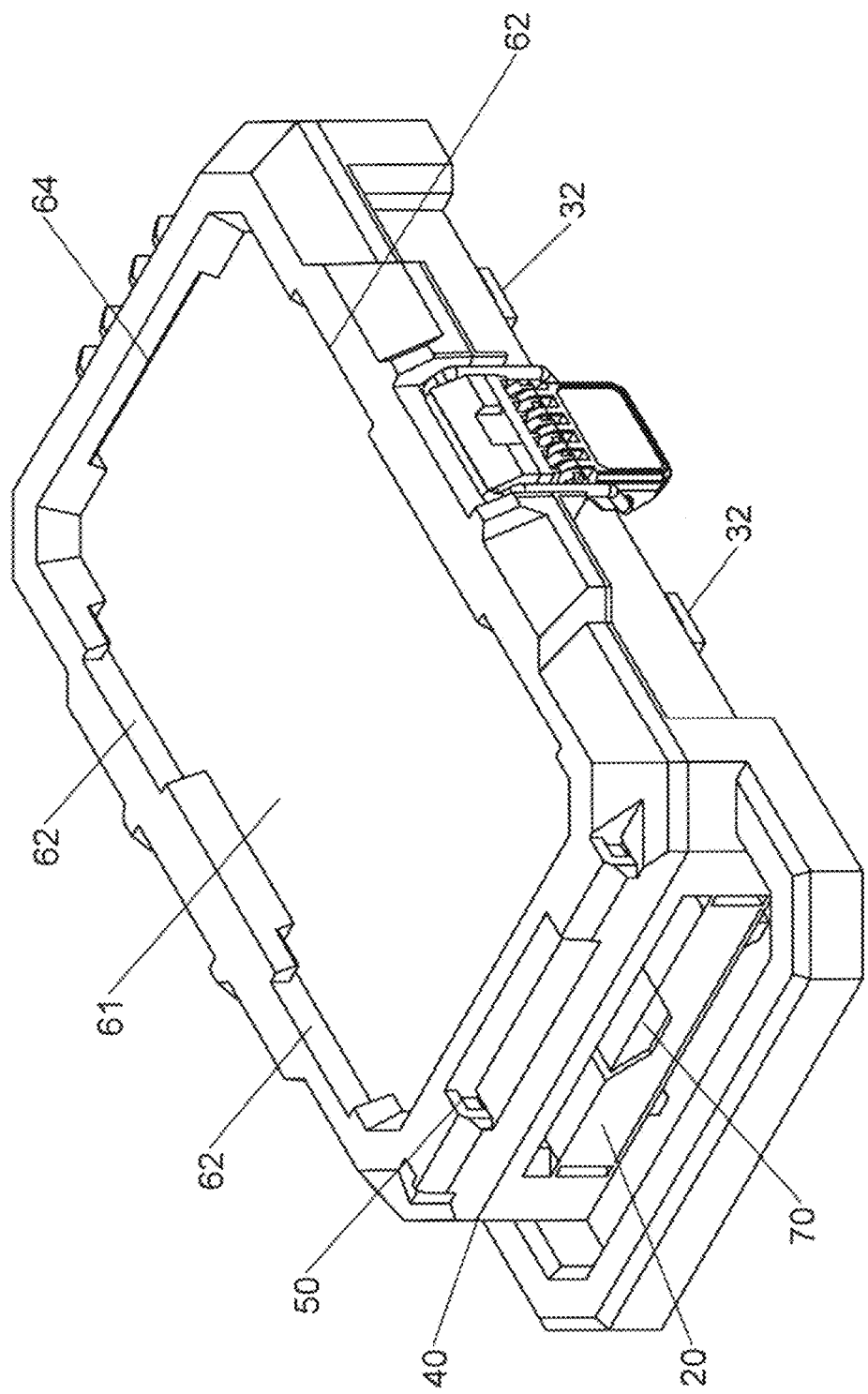
FIG. 15 is a perspective view of a tool box assembly in accordance with the fifth preferred embodiment of the present invention.

Referring to FIG. 15, the first body 10 is a narrow width case. The first body 10 is also a flat case. The first body 10 has a side provided with a handle so that the first body 10 has a carrying function.

Figure 16:
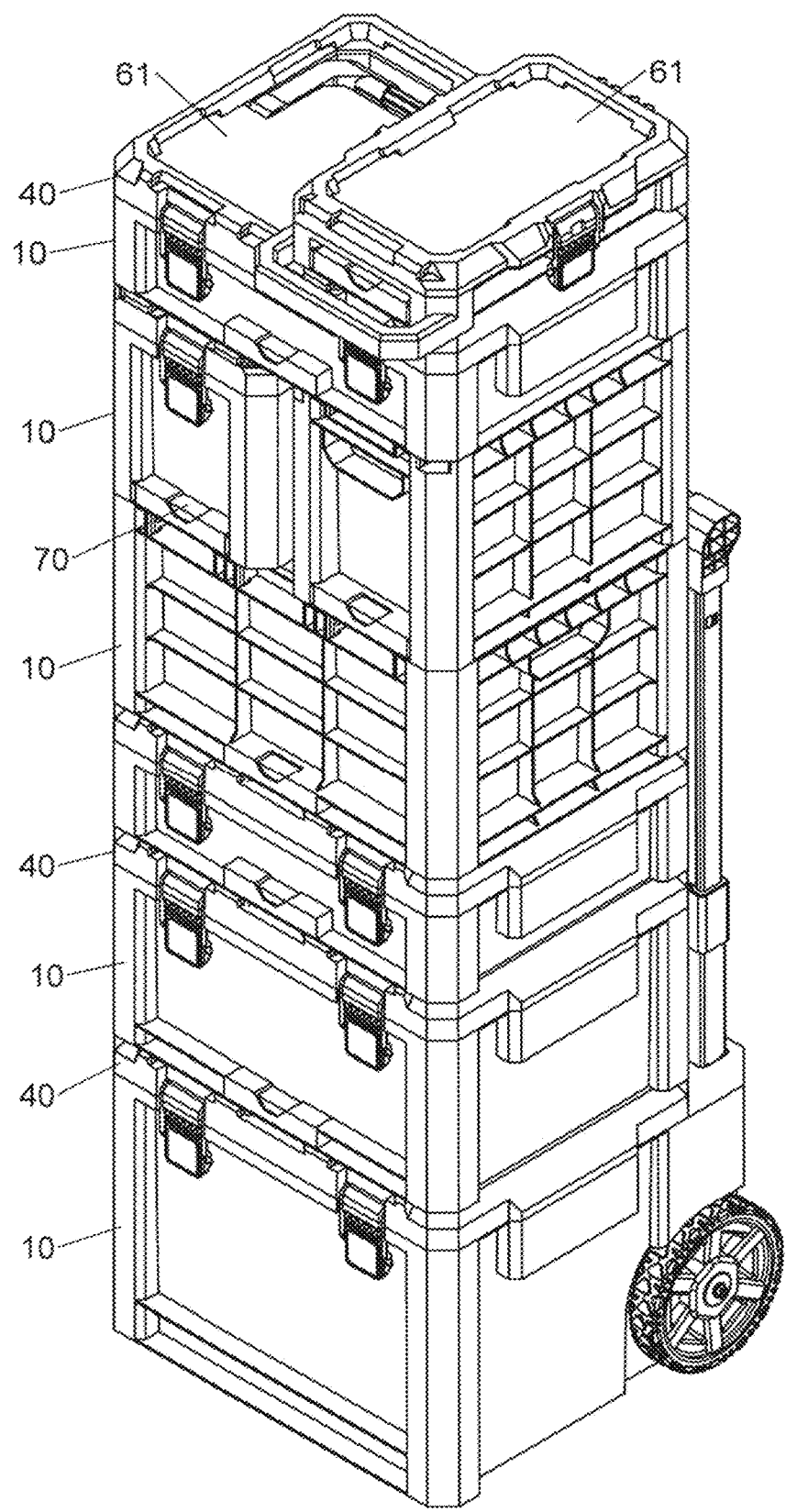
FIG. 16 is a perspective view of a tool box assembly in accordance with the sixth preferred embodiment of the present invention.
Figure 17:
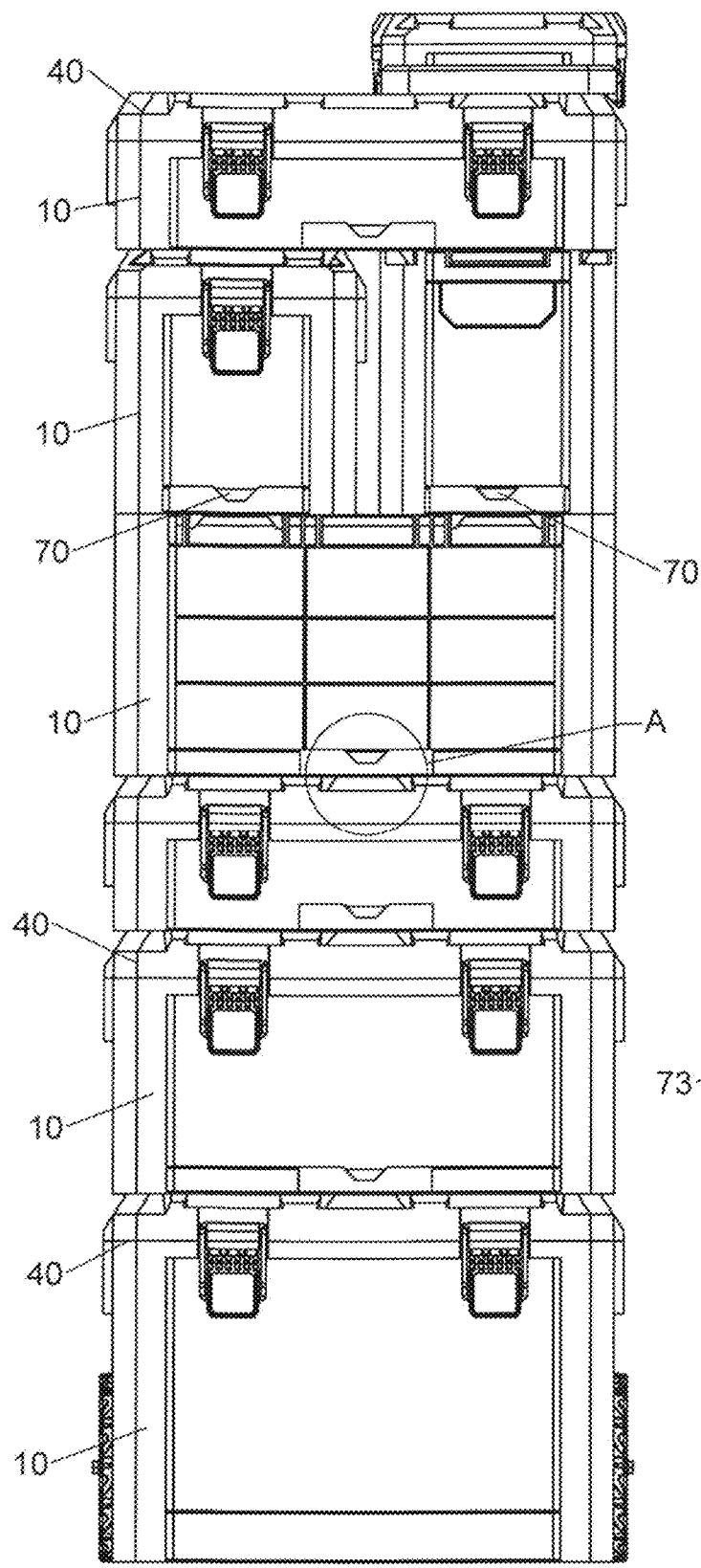
FIG. 17 is a front view of the tool box assembly as shown in FIG. 16.
Figure 18:
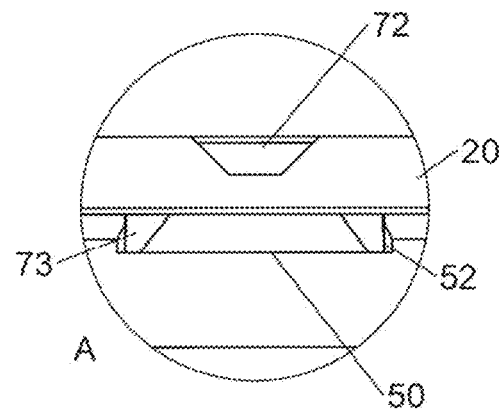
FIG. 18 is a locally enlarged view of the tool box assembly taken along circle A as shown in FIG. 17.

Referring to FIGS. 16-18, multiple first bodies 10 of different width and height and multiple second bodies 40 of different width and height are assembled. The first body 10 of a half width and the second body 40 of a half width are stacked on the first body 10 of a normal width or the second body 40 of a normal width to have different height. Thus, the multiple first bodies 10 and the multiple second bodies 40 are stacked to construct a tool car structure.

In assembly, when the multiple first bodies 10 and the multiple second bodies 40 are to be assembled, the first body 10 is pushed toward one of the three second locking units 50, without having to press the fourth locking unit 70, so that the fifth locking portion 732 of each of the two third blocks 73 is initially guided by the first inclined face 53, then slides into the second receiving recess 51 of one of the three second locking units 50, and is finally inserted into and locked by the second locking portion 52 of one of the three second locking units 50. On the contrary, when the multiple first bodies 10 and the multiple second bodies 40 are to be disassembled and detached, the fourth locking unit 70 is pressed, so that the fifth locking portion 732 of each of the two third blocks 73 is driven and unlocked from the second locking portion 52 of one of the three second locking units 50.

In conclusion, the primary principle of the present invention is in that, the first receiving portion 20 is located at the middle position of the front side of the first body 10, the first restriction portion 33 of each of the two first locking units 30 misaligns with the first receiving portion 20, the tool box assembly comprises three second locking units 50, the middle one of the three second locking units 50 aligns with the first receiving portion 20, and other two of the three second locking units 50 misalign with the first receiving portion 20 and align with the first restriction portions 33 of the two first locking units 30. The third locking unit 60 is provided with three second restriction portions 64 whose number is the same as that of the three second locking units 50, the three second restriction portions 64 are opposite to the three second locking units 50. The fourth locking unit 70 is mounted on the first receiving portion 20. The first body 10 of a standard width is stacked on the first body 10 of a half width. The first body 10 and the second body 40 are formed integrally. Thus, multiple first bodies 10 and multiple second bodies 40 of different sizes are assembled and stacked.

Accordingly, the tool box assembly of the present invention has the following advantages.

1. The at least one first locking portion 32 is locked on the at least one third locking portion 62 and the fourth locking portion 63, and the first restriction portions 33 of the two first locking units 30 are locked on two of the three second restriction portions 64. In addition, the fourth locking unit 70 is locked by one of the three second locking units 50. Thus, the tool box assembly includes at least two locking mechanisms so that the first body 10 and the second body 40 are assembled exactly.
2. The tool box assembly is available two dimensions of width. When the first body 10 and the second body 40 have a standard width, the middle one of the three second locking units 50 is assembled with the fourth locking unit 70. Alternatively, a side one of the three second locking units 50 on the second body 40 having a standard width is assembled with the fourth locking unit 70 on the first body 10 having a half width. Thus, the first body 10 and the second body 40 having two different dimensions of width can be assembled and stacked.
3. The first body 10 and the second body 40 are adapted to have a standard width or have a half width. Thus, the first body 10 and the second body 40 having a standard width or the first body 10 and the second body 40 having a half width can be assembled and stacked according to the user's requirement to enhance the versatility of the tool box assembly.
4. The first body 10 and the second body 40 are formed integrally. The first body 10 and the second body 40 having the same width are adapted to have different height so that the first body 10 and the second body 40 have different sizes and specifications and can be stacked to form a tool car.
5. The at least one first locking portion 32 is locked on the at least one third locking portion 62 and the fourth locking portion 63, and the first restriction portions 33 of the two first locking units 30 are locked on two of the three second restriction portions 64. In addition, the fourth locking unit 70 on the first body 10 of one of the tool boxes is locked by one of the three second locking units 50 on the second body 40 of another one of the tool boxes. Thus, the four positions (front, rear, left and right) of the tool box assembly are provided with locking mechanisms, so that the tool box assembly is assembled exactly and steadily.
6. When the first body 10 is placed on the second body 40, the fifth locking portion 732 of each of the two third blocks 73 of the fourth locking unit 70 is initially guided by the first inclined face 53, then slides into the second receiving recess 51 of one of the three second locking units 50, and is finally inserted into and locked by the second locking portion 52 of one of the three second locking units 50, so that the first body 10 is directly stacked on and assembled with the second body 40, without having to press the fourth locking unit 70, thereby facilitating the user assembling and stacking the tool box assembly.
7. When the second block 72 of the fourth locking unit 70 is pressed, the two third blocks 73 are moved toward each other to compress the elastic member 74, so that the fifth locking portion 732 is moved and detached from the second locking portion 52 of one of the three second locking units 50, and the fourth locking unit 70 is detached and unlocked from one of the three second locking units 50. Thus, the user only needs to press the second block 72 of the fourth locking unit 70 to remove the first body 10 from the second body 40, so that the first body 10 and the second body 40 are disassembled easily and quickly.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:
1. A tool box assembly comprising:
multiple tool boxes;
wherein:
each of the tool boxes includes a first body, a first receiving portion, two first locking units, a second body, three second locking units, a third locking unit, and a fourth locking unit;
the first body has a shape of a case or box and is used to receive hand tools;
the first body is a tool box structure or tool case structure or cabinet;
the first receiving portion is mounted on the first body;
the first receiving portion is located at a middle position of a front side of the first body;
the first receiving portion and the first body are formed integrally;
the first receiving portion is provided with a first receiving recess having an open bottom;
the first receiving portion is provided with an opening connected to the first receiving recess;
the opening is directed upward;
the two first locking units are mounted on a bottom of the first body;
each of the two first locking units is provided with a projecting piece;
the projecting piece has two sides each provided with at least one first locking portion;
the projecting piece has another side provided with a first restriction portion misaligning with the first receiving portion;
the first locking portions at the two sides of the projecting piece and the first restriction portion are arranged at three sides of the projecting piece;
the second body is assembled with the first body, covers the first body, or is pivotally connected with the first body;
the second body and the first body are opened or closed;
the second body is a cover;

the second body has a shape matching that of the first body;
the three second locking units are mounted on a side of the second body and are arranged linearly;
a middle one of the three second locking units aligns with the first receiving portion, and other two of the three second locking units misalign with the first receiving portion and align with the first restriction portions of the two first locking units;
each of the three second locking units is provided with a second receiving recess;
the second receiving recess has two sides each provided with a second locking portion;
the second receiving recess has an open front having two sides each provided with a first inclined face;
the first inclined face expands outward from the second receiving recess and aligns with the second locking portion;
the third locking unit is locked on the two first locking units so that the second body and the first body are assembled and cannot be detached from each other;
the third locking unit is provided with a receiving space receiving the two first locking units;
the receiving space of the third locking unit is provided on a top face of the second body;
the receiving space has two sides each provided with at least one third locking portion;
the at least one third locking portion has a side provided with a fourth locking portion connected to the at least one third locking portion;
the at least one third locking portion and the fourth locking portion align with the at least one first locking portion;
the at least one third locking portion and the fourth locking portion are locked on the at least one first locking portion;
the at least one first locking portion is initially introduced into the at least one third locking portion and then inserted into and locked in the fourth locking portion;
the receiving space has another side provided with three second restriction portions for receiving and locking the first restriction portion;
two of the three second restriction portions are locked on the first restriction portions of the two first locking units;
the three second restriction portions and the three second locking units have the same number;
the three second restriction portions are opposite to the three second locking units;
the three second restriction portions are spaced from each other and are arranged linearly;
the fourth locking unit is mounted on the first receiving portion or mounted in the first receiving recess;
the fourth locking unit is locked on one of the three second locking units;
when the fourth locking unit is driven or pressed, the fourth locking unit is controlled to be detached from the three second locking units;
the first body and the second body are moved mutually or are not moved mutually by control of the fourth locking unit and the three second locking units, so that the two first locking units and the third locking unit are detached mutually or are not detached mutually;
the fourth locking unit includes a first block, a second block, two third blocks, and an elastic member;
the first block is provided with two slots spaced from each other;
each of the two slots has a rectangular hollow shape;
the second block is received in the first receiving recess;
the second block is pressed and moved through the opening;
the second block is spaced from the first block with an interval;
the second block is provided with a channel transversely extending through the second block;
the second block is provided with four second inclined faces arranged in the channel;
the four second inclined faces form a trapezoid groove;
the two third blocks are opposite to each other relative to the second block;
the two third blocks are received in the channel;
the two third blocks are transversely moved in the channel synchronously;
each of the two third blocks has a first end provided with two third inclined faces slidably abutting two of the four second inclined faces;
each of the two third blocks has a second end provided with a fifth locking portion protruding from one of the two slots;
the fifth locking portion is locked on the second locking portion of one of the three second locking units;
each of the two third blocks is provided with a receiving hole close to the two third inclined faces;
the receiving holes of the two third blocks face each other; and
the elastic member is elastically biased in the receiving hole of each of the two third blocks and is compressed by movement of the two third blocks to provide a restoring force to the two third blocks.

2. The tool box assembly as claimed in claim 1, wherein the projecting piece has a grid shape with ribs, the at least one first locking portion is an L-shaped projection, the first restriction portion is an elongate piece, the second receiving recess is an elongate open slot, and the second locking portion is a groove.

3. The tool box assembly as claimed in claim 1, wherein the at least one third locking portion and the fourth locking portion form an L-shaped groove, and each of the three second restriction portions is an elongate slot.

4. The tool box assembly as claimed in claim 1, wherein the first block is an elongate sheet plate and is provided with four through holes arranged at four corners of the first block, the four through holes are located outside of the two slots, the second block has a cuboid shape, and the fourth locking unit further includes four screw members extending through the four through holes and screwed into the first receiving recess of the first receiving portion, so that the fourth locking unit is mounted in the first receiving recess.

5. The tool box assembly as claimed in claim 1, wherein:
the fourth locking unit is assembled in the first receiving recess;
the second block is pressed through the opening and moved in one direction;
the two third inclined faces are slidable on the two of the four second inclined faces;
the second block drives the two third blocks to move relative to each other;
the two third blocks are moved toward each other so that the elastic member is compressed;
the fifth locking portion is moved by each of the two third blocks and detached from the second locking portion of one of the three second locking units so that the fourth locking unit is detached from one of the three second locking units;

the second block is moved in a direction perpendicular to that of each of the two third blocks;

when the first body is moved relative to the second body, the at least one first locking portion of each of the two first locking units is unlocked from the fourth locking portion and retracted into the at least one third locking portion, and the first restriction portions of the two first locking units are unlocked from two of the three second restriction portions, so that the two first locking units are detached from the third locking unit, and the first body is removed from the second body;

when the first body of one of the tool boxes is to be assembled with the second body of another one of the tool boxes, it is unnecessary to press the fourth locking unit, and the first body is placed on the three second locking units, so that the two first locking units are received in the third locking unit, the projecting piece of each of the two first locking units is received in the receiving space, the at least one first locking portion of each of the two first locking units is inserted into the at least one third locking portion, and the first restriction portions of the two first locking units align with two of the three second restriction portions;

when the first body is moved, the fifth locking portion of each of the two third blocks is guided by the first inclined face and slides into the second receiving recess of one of the three second locking units;

the two third blocks are pushed by the first inclined face and moved toward each other, so that the fifth locking portion of each of the two third blocks is locked by the second locking portion of one of the three second locking units by the restoring force of the elastic member, and the fourth locking unit is locked by one of the three second locking units; and when the first body is further moved, the at least one first locking portion of each of the two first locking units is locked by the fourth locking portion, and the first restriction portions of the two first locking units are locked by two of the three second restriction portions, so that the two first locking units are locked on the third locking unit, and the first body is stacked on the second body.

6. The tool box assembly as claimed in claim 1, wherein multiple first bodies and multiple second bodies are assembled and stacked to be served as a tool car.

7. The tool box assembly as claimed in claim 1, wherein:
the first body and the second body are formed integrally;
the third locking unit is connected to an interior space of the first body;
each of the tool boxes only includes a first locking unit which is provided with a projecting piece;
the projecting piece has a frame shape;
the projecting piece is provided with two first restriction portions;

the two first restriction portions of one of the tool boxes are locked on two of the three second restriction portions of another one of the tool boxes; and
the fourth locking unit of one of the tool boxes is locked by one of the three second locking units of another one of the tool boxes.

8. The tool box assembly as claimed in claim 1, wherein:
the first body has a half width, and the second body has a half width;
each of the tool boxes only includes a second locking unit;
the third locking unit is only provided with a second restriction portion; and
two first bodies of a half width are juxtaposed to each other and are assembled on the second body of a normal width, or two second bodies of a half width are juxtaposed to each other and are assembled on the first body of a normal width.

9. The tool box assembly as claimed in claim 1, wherein:
multiple first bodies of different width and height and multiple second bodies of different width and height are assembled;
the first body of a half width and the second body of a half width are stacked on the first body of a normal width or the second body of a normal width to have different height; and
the multiple first bodies and the multiple second bodies are stacked to construct a tool car structure.

10. The tool box assembly as claimed in claim 1, wherein:
the first receiving portion is located at the middle position of the front side of the first body;
the first restriction portion of each of the two first locking units misaligns with the first receiving portion;
the tool box assembly comprises the three second locking units;
the middle one of the three second locking units aligns with the first receiving portion, and other two of the three second locking units misalign with the first receiving portion and align with the first restriction portions of the two first locking units;
the third locking unit is provided with three second restriction portions whose number is the same as that of the three second locking units;
the three second restriction portions are opposite to the three second locking units;
the fourth locking unit is mounted on the first receiving portion;
the first body of a standard width is stacked on the first body of a half width;
the first body and the second body are formed integrally; and
multiple first bodies and multiple second bodies of different sizes are stacked.

* * * * *